No. 868,375. PATENTED OCT. 15, 1907.
A. TWER.
APPARATUS FOR GRASPING THE SKELP OF A TUBE TO BE WELDED.
APPLICATION FILED OCT. 18, 1905.
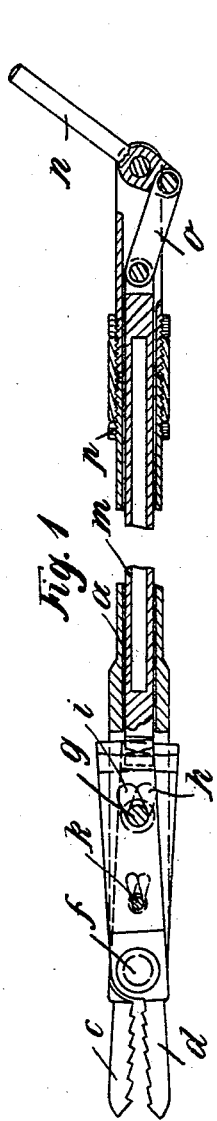
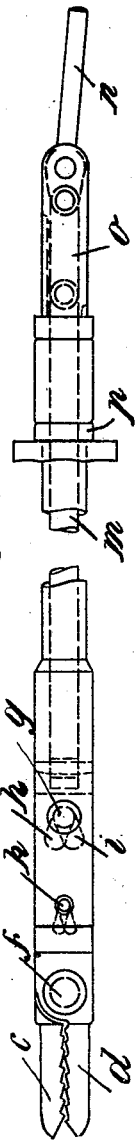
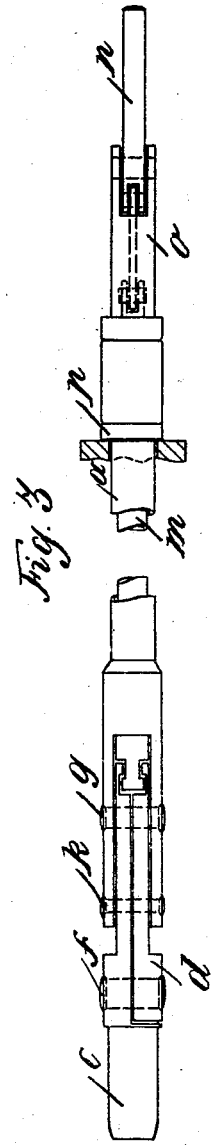
Witnesses:
Inventor
Albert Twer
per
G. Dittmar
Attorney.

UNITED STATES PATENT OFFICE.

ALBERT TWER, OF NASSAU, GERMANY.

APPARATUS FOR GRASPING THE SKELP OF A TUBE TO BE WELDED.

No. 868,375.  Specification of Letters Patent.  Patented Oct. 15, 1907.

Application filed October 18, 1905. Serial No. 283,278.

*To all whom it may concern:*

Be it known that I, ALBERT TWER, a subject of the King of Prussia, German Emperor, residing at Nassau, Kingdom of Prussia, German Empire, have invented a new and useful Improvement in an Apparatus for Grasping the Skelp of a Tube to be Welded.

My invention relates to improvements particularly in that type of apparatus which are used to grasp, by means of tongs, the skelp in the furnace from which the tube is made on a draw bench and to withdraw the same and the tongs by means of a link connected to the wagon of the draw bench. And in order that my invention may be more fully understood I have caused to be appended hereunto one sheet of drawings showing an apparatus constructed in accordance with my invention, and marked with letters of reference indicating like parts in the various figures.

Figure 1 is a longitudinal section showing the welding tong with the jaws open, while Fig. 2 is a side elevation showing the jaws closed. Fig. 3 is a plan of Fig. 2.

To this end I employ a tubular holder $a$ the end of which is formed with a slot to receive the welding tong proper. The latter consist of the members $c$ & $d$ which are connected by the pivot $f$ in such a manner that the jaws are caused to open when the arms of the said tong members $c$ & $d$ open and to close when the said arms are caused to approach each other. The said movement of the tong members can be effected by a longitudinal movement being imparted to the welding tong proper.

The inner end of the slot of the holder $a$ has fixed across the same a bolt or rivet $g$, the latter also passing through inclined slots $h$ & $i$ formed in the members of the tongs so that the jaws close more and more the further away the latter are caused to move from the said bolt or rivet.

To prevent the tong proper from flying out of the slot of the holder $a$, a second bolt or rivet is provided which also passes through corresponding inclined slots formed in the said tong members. The longitudinal movement required to close and open the jaws of the said tong is effected by means of the hollow rod $m$ which is connected by the link $o$ to the hand lever $n$ the latter being pivotally secured to the holder $a$. When the hand lever $n$ is in the position as shown in Fig. 1 the said tong is open, whereas when in the position shown in Fig. 2 the same is closed.

The connection between the tong members $c$, $d$ and the rod $m$ is shown more particularly in Fig. 3 and is made by forming the end of the rod $m$ in T fashion adapted to engage in corresponding recesses in the arm sides of the long members $c$, $d$.

The welding tongs operate as follows:—The hand lever $n$ is turned upwards and through this movement the jaws are caused to open, the tong is then pushed towards the skelp until it is between the jaws and is grasped on forcing down the hand lever $n$. Then in the well known manner the link is placed over the tongs into its proper position and finally connected with the wagon of the draw bench. This is accomplished by securing a forked or other suitable bracket to the draw bench and connecting the same with the collar $p$ on the holder $a$. The latter is consequently drawn by the wagon of the said draw bench which causes the bolt or rivet $g$ to increase its distance from the jaws automatically through the pulling action and thus they are kept firmly closed while being drawn.

Having now particularly described and ascertained the nature of my said invention and in what manner the same is to be performed I declare that what I claim is—

Apparatus for grasping the skelp of a tube to be welded, comprising a hollow carrier $a$, having a longitudinal slot at one end, cross-pins $g$ and $k$ traversing the slot and riveted in the carrier, a lever fulcrumed at the opposite end, a pair of tongues lodged in the slot having inclined apertures in their shanks to engage said cross-pins, and offsets at the extreme ends in the rear, a sliding bar $m$ guided in the hollow space of the carrier with a T-shaped head at the front end to engage said offsets and a link $o$ at the rear end connecting said bar with the lever, substantially as described and for the purpose set forth.

In testimony whereof I have signed my name to this specification in the presence of two subscribing witnesses.

ALBERT TWER.

Witnesses:
BESSIE F. DUNLAP,
LOUIS VANDORN.